United States Patent

Stevens et al.

[15] 3,697,973
[45] Oct. 10, 1972

[54] SOUND HAZARD INTEGRATOR

[72] Inventors: Alan F. Stevens, Oak Creek; Arnold A. Bergson, Milwaukee, both of Wis.

[73] Assignee: Quest Electronics Corporation, Milwaukee, Wis.

[22] Filed: March 19, 1970

[21] Appl. No.: 21,153

[52] U.S. Cl. ............................... 340/261, 340/258 D
[51] Int. Cl. .............................................. G08b 13/00
[58] Field of Search.....340/261, 17, 258 D; 328/127; 235/183; 330/110

[56] References Cited

UNITED STATES PATENTS

| 3,543,261 | 11/1970 | Burney | 340/261 |
| 3,276,006 | 9/1966 | Hanson | 340/261 |
| 2,731,520 | 1/1956 | Richardson | 340/261 UX |
| 3,484,593 | 12/1969 | Schmoock et al. | 235/183 |
| 3,015,779 | 1/1962 | Levinthal | 328/127 X |
| 2,448,322 | 8/1948 | Piety | 328/127 X |
| 2,991,458 | 7/1961 | Cooke et al. | 340/258 UX |
| 3,151,299 | 9/1964 | Smith | 328/127 X |
| 3,303,425 | 2/1967 | Pendleton | 328/127 X |
| 3,333,090 | 7/1967 | Neer | 235/183 X |
| 3,482,440 | 12/1969 | Curwen | 235/183 X |
| 3,504,267 | 3/1970 | James et al. | 328/127 X |

Primary Examiner—John W. Caldwell
Assistant Examiner—Michael Slobasky
Attorney—John W. Michael, Gerrit D. Foster, Bayard H. Michael, Paul R. Puerner, Joseph A. Gemignani, Robert E. Clemency, Andrew O. Riteris, Glenn A. Buse' and Spencer B. Michael

[57] ABSTRACT

A cumulative sound exposure instrument has an alarm indicator responsive to a selected maximum instantaneous loudness level and has a second indicator which is responsive to a selected value of accumulated exposure. A register provides a continuous reading of the amount of exposure. The instrument integrates a function over time to give a reading that accumulates faster for higher loudness levels. The elements that accomplish these functions include a sound pickup system which applies a signal to a frequency compensating shaping system for shaping the signal output in accordance with an ear's response. An amplitude responsive shaping network receives the signal and applies an output to a pulser in accordance with the function which will be integrated. The pulser output is proportional to the voltage of the input and drives a counter to accumulate an exposure reading. Minimum and maximum threshold detectors control the pulser output so that the counter is driven only when the loudness level lies between two preset limits.

15 Claims, 5 Drawing Figures

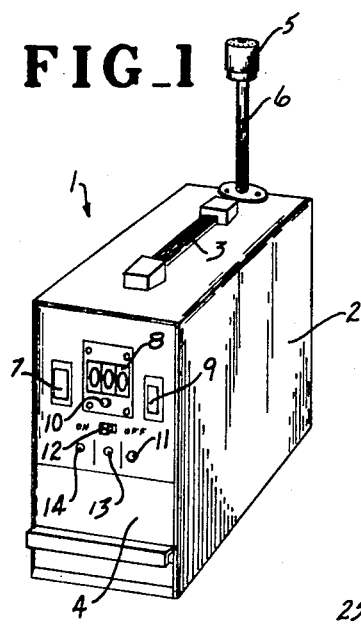
FIG_1
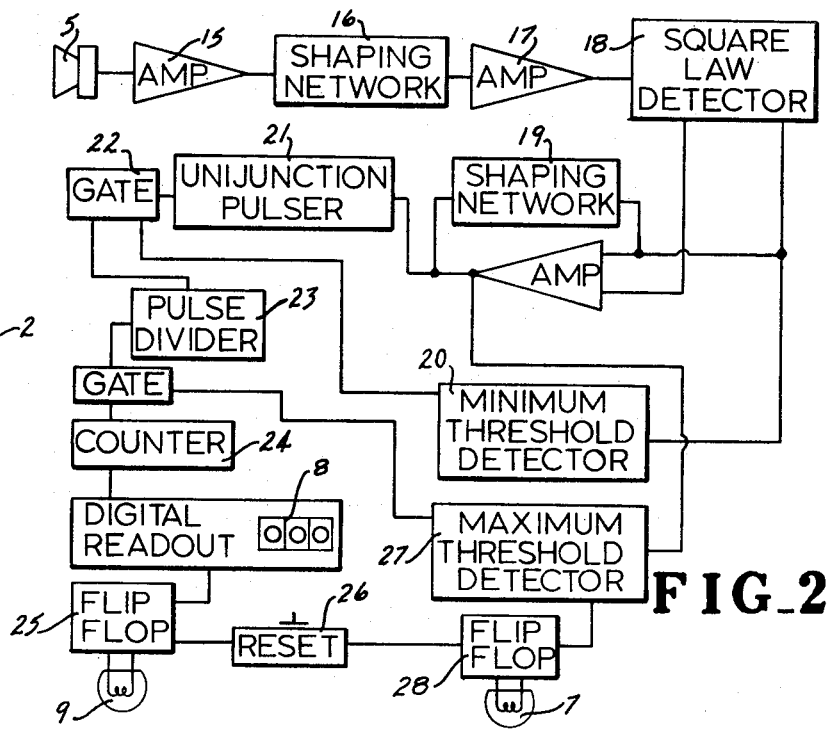
FIG_2
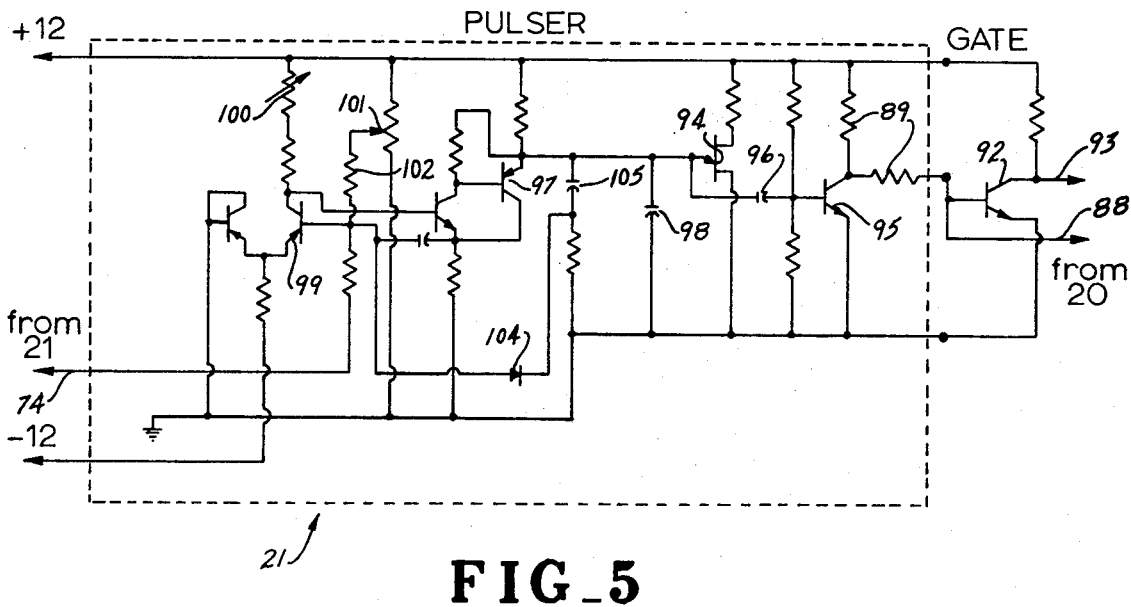
FIG_5

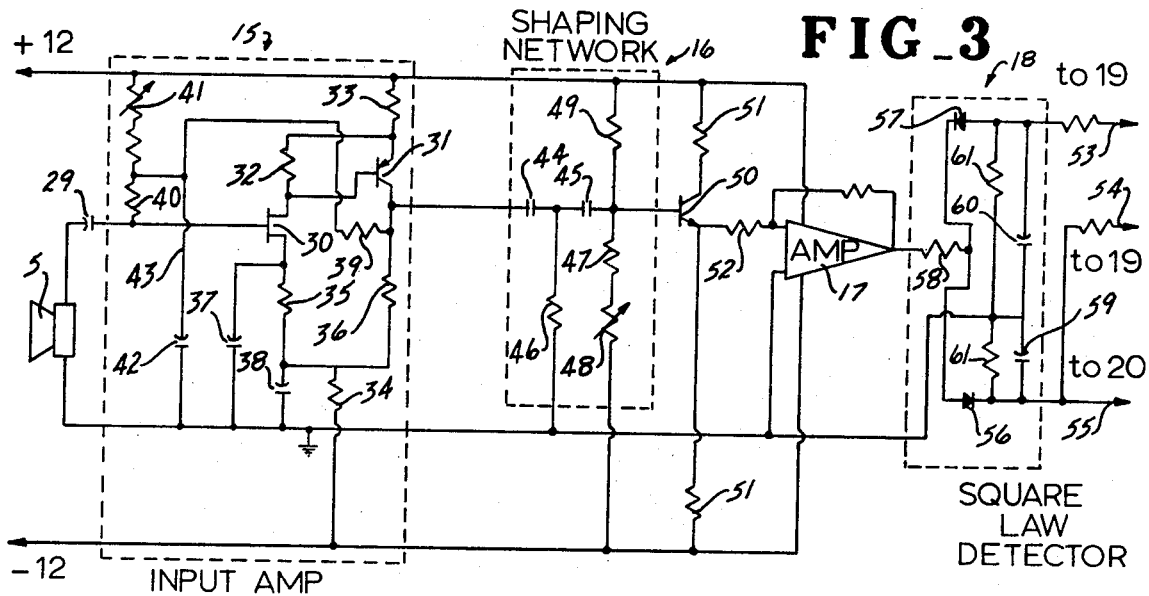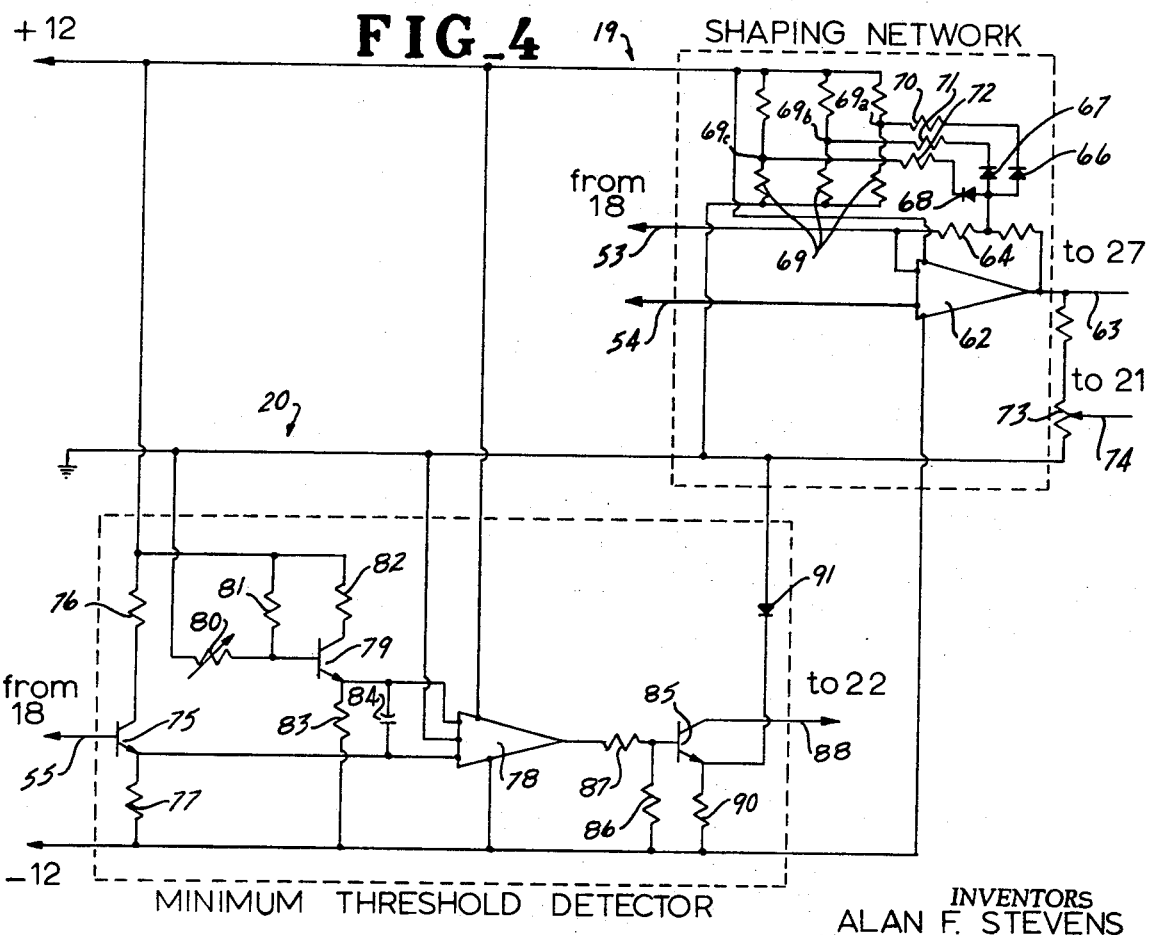

SOUND HAZARD INTEGRATOR

BACKGROUND OF THE INVENTION

This invention relates to electronic instruments and more particularly to sound level indicating instruments.

Noise hazards are causing increasing concern, especially in manufacturing plants and other commercial establishments subject to legal health standards which limit the permissible exposure of their employees to noise. It has been determined that exposure to various sound levels within a certain range will vary in its harmful effects according to the loudness, and the legal requirements reflect this fact. Thus, a lower level noise in the range may be permissible over a longer time period than a higher noise level.

With prior art instruments, however, it has been virtually impossible to make accurate determinations of the harmful level of exposure. Generally, the available instruments do not provide a cumulative reading over time, and the instantaneous readings which could be taken required skilled personnel capable of calculating from periodic readings the cumulative harmful effect over a day.

Reasonable guesses, in fact, were all the skilled operators could accomplish; with such instruments they had to take instantaneous readings at various times and then average these readings over a period. Calculations of allowable noise over a period were more difficult where variations in the noise level often occurred, since each noise level has a different permissible duration time. To be safe, therefore, the noise level and duration calculations were necessarily liberal and the highest possible averages would be chosen because there was no practical way of showing that the actual cumulative noise levels were less.

Other available equipment establishes readings in terms of the time over which the sound level is above only certain preset levels. This type of reading is not an accurate determination of the actual noise hazard being experienced. In particular, the treatment of short duration, repetitive noise bursts by prior indicators was inaccurate, and as a result the peak level during short intervals was considered as the average level for at least a one second period. Prior instruments, such as those with needle and scale indicators, could not resolve the noise level for lesser intervals than one or a few seconds. In machine shops and the like, the effect of these inaccurate determinations was to greatly increase the calculated harmful effects of the noise level, and thereby to decrease the permissible exposure time.

SUMMARY OF THE INVENTION

The present invention solves or avoids the problems of the prior art and has further advantages which will be summarized here and will appear from the drawings and description.

The invention is a loudness level indicator instrument which automatically calculates the cumulative harmful exposure to noise levels occurring over a predetermined period. The instrument has high resolution and accuracy even for noise bursts of short duration such as less than 1 second. In this way the invention provides a reading in accordance with a preselected permissible exposure period for the actual cumulative harmful noise which is experienced. No calculations need be made by the user.

The instrument includes an alarm indicator for instantaneous noise levels above a certain predetermined maximum which is considered to be harmful for any detectable duration of exposure. For other noise levels, the device of the invention employs a digital accumulating and readout means which may include for optimum results a digital register having a running digital readout showing the cumulative harmful exposure over a predetermined minimum threshold loudness level. Another indicator connected to the digital register signals when a predetermined cumulative harmful noise exposure has been experienced.

The loudness level is the way in which the human ear responds to sound and is usually expressed in decibels. The ear senses higher audible frequencies more readily than lower frequencies, and the ear response also drops off in the 8,000 hertz range.

The device of the present invention includes suitable shaping networks such that the response is essentially in accordance with the actual hearing response of human ear. The output of the network correspondingly is coupled to drive a counter and register in accordance with the sensed loudness level.

In a highly novel and preferred construction of the present invention, a microphone senses the sound, and after suitable amplification, frequency response shaping and detection, establishes a related driving signal connected to a final amplitude shaping network and to a minimum level detector. The final shaping network includes an amplifier connected to drive a cumulative response system. This amplifier also drives a maximum level detector.

The final shaping network responds rapidly to each noise level and shapes the signal to provide a modified proportional voltage source in which the voltage increases more rapidly for the higher loudness levels and less rapidly for the lower loudness levels. The network is connected to actuate a pulser at a rate proportional to the voltage input. The pulser drives a digital counter at a rate proportional to the voltage and therefore in accordance with the lesser or greater time permissible for that noise level to be detected. The counter, thus, is driven so that the register cumulates faster for higher loudness levels, and being continuously responsive to the varied pulse rate of the pulser, it in effect, integrates the sound level and sound effectiveness which determine the cumulative exposure allowed.

This operation may be represented by a function as follows: letting $C_n$ = the total time experienced at a specific noise level; $T_n$ = the total time permitted at that noise level; and $F_n = C_n/T_n$. The instrument of the invention should give an indication of too much exposure when $\int fn\, dt = 1$, where $fn$ is scaled to represent $1/T_n$ and $dt$ is the zero limiting value of $C_n$.

The counter is driven only at loudness levels in a predetermined decibel range. For this purpose, the minimum threshold detector is incorporated within the networks and signals a gate between the pulser and counter to open the gate only when the minimum threshold is reached. The maximum threshold detector provides a signal to a second gate and cuts off the counter, while the alarm indicator is energized when the maximum threshold has been reached.

The pulser may advantageously pulse at a higher rate than that required to directly drive the counter in order to establish high resolution of short duration noises. A pulse divider is included between the pulser and counter to reduce the rate to the counter's scaled level.

The above electronic networks of the invention are designed to accurately shape the signal fed to the pulser so that the readout is in accordance with the loudness level of the sound and in accordance with the harmful effect which increases with decibel increases.

The present invention provides, in this way, accurate, reliable, cumulative sound hazard measurements, while the combination is manufactured with ease and low cost.

DRAWINGS

The drawings illustrate the best mode of the invention which is presently contemplated.

In the drawings:

FIG. 1 is a perspective view of the invention;

FIG. 2 is a block diagram showing generally the elements of the illustrated embodiment of the invention and their interrelations;

FIG. 3 is a schematic circuit diagram of a part of the invention shown in FIG. 2;

FIG. 4 is a schematic circuit diagram of another part of the invention which is connected to the circuit of FIG. 3; and FIG. 5 is a schematic circuit diagram of another part of the invention shown in FIG. 2.

DESCRIPTION

In the drawings, and referring particularly to FIG. 1, a portable instrument 1 includes an outer casing 2 with a handle 3 and a front wall 4 with the manual controls and indicators of the invention mounted thereon. Within the casing is a battery (not shown in FIG. 1) and the circuits of the invention which operate and respond to a microphone 5 supported on the top of casing 2 by a hollow shaft 6 that confines the electrical connections for the microphone 5.

On front wall 4 is disposed a hazard indicator 7, being a lamp in this example of the invention. Lamp 7 lights in response to an instantaneous threshold noise level sensed by microphone 5, for instance, at a 115 decibel level, which may be considered a hazardous noise level at any detectable period of duration. A digital register 8, also set in front wall 4, is driven by the circuits of the invention to establish a direct, digital readout indicating the percentage of maximum permissible cumulative exposure which has been sensed by microphone 5 over a predetermined time period, or 8 hours in this example. Front wall 4 also has a maximum cumulative exposure indicator 9, being a lamp, that lights when register 8 reaches 100 percent in this example.

The face of instrument 1 is the location of operating controls as well, including a reset button 10 for the register, an electronic reset button 11 for indicators 7 and 9 and an on-off switch 12 for controlling the power circuit. The latter circuit includes a power-on indicator 13 and a low battery indicator 14, which may be lamps disposed in sockets on the front wall.

Low battery indicator 14 is a device energized by an automatic battery test network. Light 14 is energized when battery power ebbs to a lower limit for proper operation of instrument 1. Not being the subject of the present invention, no further detail of this network will be supplied here.

Referring now to FIG. 2, the apparatus within casing 2 includes a preamplifier 15 connected to receive a signal input from microphone 5. Amplifier 15 supplies a signal input to a signal shaping network 16 which is a frequency responsive network for weighting the signal response to correspond with the loudness level of the sound being sensed. The weighting is thus in accordance with the A Scale curve, where signals in the low frequency range, such as 25 hertz, do not pass as readily as those in the higher audible range, up to about 8,000 hertz where the response again drops off. Thus, shaping network 16 together with microphone 5 establishes a signal input to the respective following elements which results in an instrument response that simulates the actual sensitivity of a human ear to various audible frequencies, as more fully described in the previously referred to copending application.

A linear amplifier 17 receives the signal from network 16, amplifies the signal without shaping it, and conducts the signal to a square law detector 18. Detector 18 provides two rectified output signals, both being generally proportional to the square of the input to the detector. A doubled output is provided to an amplifier shaping network 19, and a positive output is also fed to a minimum threshold detector 20.

Amplifier and shaping network 19 serves to shape the signal in response to its amplitude for purposes of obtaining a digital readout that accumulates faster for higher amplitude sound. In accordance with the illustrated embodiment, amplifier and shaping network 19 establishes an output proportional to input voltage, which response, in accordance with the invention, is such that the output increase accelerates for higher amplitudes within a predetermined range. This range is such as to lie between the level of noise required to turn on minimum threshold detector 20 and the maximum permissible instantaneous noise level which is detected by another detector.

The signal from network 19 is provided to a unijunction pulser 21 which pulses at a rate proportional to the voltage input. The output of pulser 21 is thus in accordance with the required function, described earlier, and due to the shaping of the signal by network 19 it is in effect integrating, over instantaneous values of the noise level, the corresponding ratios of the times at the noise levels to the total times permissible at the levels. The output of pulser 21, therefore, is in terms of a series of d.c. pulses which when summed represent the cumulative harmful exposure to the varied noise levels.

Since it is desired to count pulses resulting only from noise levels over a certain minimum threshold, a positive signal output from detector 18 is compared to a set threshold voltage established in minimum threshold detector 20. The threshold detector turns on when the level is reached or surpassed, and conducts a signal to a gate 22 which is connected to transmit the output of pulser 21. Detector 20 opens and closes gate 22 so that a pulsed output passes from pulser 21 when the desired minimum noise level is reached.

Unijunction pulser 21 pulses at a comparatively high rate, in the range of a predetermined minimum value to 32 times the minimum value. The instrument has been found to give high resolution for noise variations occurring in the space of 1 second or less when the pulse rate has been in the range of 17.78 pulses per second, for a minimum noise threshold of 90 db, to 569 pulses per second for the maximum threshold of 115 db. The networks in pulser 21 for accomplishing this variation will be described later; the pertinence here being to illustrate the relatively high pulse rates employed.

Since an economically available counter would not read intelligibly at the high pulse rates, a pulse divider 23 is connected to receive the output from gate 22. Divider 23 may be the common network having a series of bistable flip flops that successively respond to the pulsed input and require a predetermined number of pulses before the divider network provides a related signal output pulse. In the above example of the pulse rate employed, it has been found that a series of 9 flip flops, scaling the pulse rate down by a factor of 512, will provide the desired pulse output for driving a counter for the 8-hour period of the example. To preserve battery life, solid state, low level flip flops are preferred.

Pulse divider 23 thus establishes a pulse signal to a counter 24, which may be any standard electromechanical counter. A second gate, between the divider and counter, may be controlled by a maximum threshold detector, described later, to determine the upper decibel level of operation for the instrument. The counter drives register 8 to give a digital readout which is in terms of a percentage of the total permissible cumulative hazard over a predetermined time, being in the range of 8 hours to 15 minutes with the pulse rates described in the above example.

When register 8 reaches its maximum, or 100 percent, a suitable switching circuit is energized to pass a signal to a switch shown as a flip flop 25 which is then in condition to turn on lamp 9. Lamp 9 lights and indicates that maximum cumulative exposure has been reached. The lamp remains lit until an electronic reset 26 is activated by operation reset button 11 to signal flip flop 25 and change the condition of the flip flops so that it turns off the switch for lamp 9.

A predetermined, maximum, instantaneous loudness level is required to light lamp 7. For this purpose, a maximum threshold detector 27 is connected to the output terminal of amplifier shaping network 19. Detector 27 may be any suitable amplitude detector. For example, a Schmidt trigger network may be employed to detect the threshold, since this device is a bistable network whose state depends on the amplitude of the input voltage. At a maximum amplitude voltage corresponding to a maximum noise level, for example, 115 db, detector 27 triggers a flip-flop 28 which is like flip-flop 25 and operates similarly to turn lamp 7 on.

The above description generally illustrates the combination of networks which provide an optimum performance of the invention. Several of the networks and their manner of combination are particularly pertinent to the best operation of instrument 1, and they will now be described. Referring particularly to FIG. 3, microphone 5, preamplifier 15, signal shaping network 16, linear amplifier 17 and square law detector 18 are shown in detail.

A regulated power supply (not shown) provides ±12 volt power for energizing of the several electronic circuits. Microphone 5 is connected to the positive lead through a blocking capacitor 29 and to a common ground. The signal from the microphone is conducted to preamplifier 15 which includes a field effect transistor 30 and a cascaded PNP transistor 31. The microphone is connected to the gate of field effect transistor 30, the output of which is provided transistor 31. The usual biasing resistors 32 and 33 connect between the positive power lead and their respective transistor, and a resistor 34, on a line from the negative lead, is connected to the other side of the respective transistors through resistors 35 and 36.

Resistor 35 is part of a R-C stabilizing network for field effect transistor 30, this network including a parallel capacitor 37 connecting across the resistor to ground and a capacitor 38 between resistor 35 and ground. A negative feedback path is provided for further stabilizing and gain limiting from the collector of transistor 31 through a large resistance 39 and a resistor 40 of a voltage divider network between the positive power supply and the gate of transistor 30. The voltage divider network includes a variable resistor 41 which may be set to vary the sensitivity of transistor 30 to signal inputs. The a.c. portion of the feedback voltage is eliminated by a blocking capacitor 42 on a lead 43 from the voltage divider and ground.

By the above means, preamplifier 15 provides a signal output which is essentially free of extraneous signals. The output is received by shaping network 16 for weighting the signal in accordance with loudness level over the audio frequency range. In the illustrated embodiment, a cascaded R-C network is provided including a pair of similar, relatively small capacitors 44 and 45. Capacitors 44 and 45 are series connected to the output lead from the amplifier 15.

A resistor 46 connects between capacitor 44 and ground, while resistors 47 and 48 are connected across capacitor 45 to −12 power and a resistor 49 connects the capacitor 45 to the positive potential line to define a cascaded pair of R-C circuits which gives an "A Scale" frequency response to the input.

The output of network 16 is coupled to linear amplifier 17 by an emitter follower connected, NPN transistor 50 which is connected to positive and negative potential supply through resistors 51. The emitter of transistor 50 connects to an input resistor 52 connected to the input terminal of amplifier 17, and resistor 48 sets the emitter of transistor 50 at ground potential.

Linear amplifier 17 is a standard device connected across the ±12 volt power supply. Suitable feedback and other networks are included to give good linear amplification to the signal output which is fed to square law detector 18.

Detector 18 provides two outputs, one between leads 53 and 54 connected to amplifier and shaping network 19, and a second between lead 55 and ground, this lead being connected to minimum threshold detector 20. The output to network 19 is rectified, doubled, and shaped proportionately to the input voltage, while the signal to detector 20, is rectified and similarly squared.

In detector 18 a pair of oppositely polarized, paralleled diodes 56 and 57 are connected to the output of amplifier 17 in series with a resistor 58 which extends their square law range. In one direction the input is conducted through diode 56. A holding capacitor 59 is connected past diode 56 to ground, and a holding capacitor 60 is similarly connected to diode 57 in the other half of the network such that the potentials of capacitors 59 and 60 add. The potential across lines 53 and 54 is thus a partially squared and doubled output for network 19 and provides a corresponding output to detector 20. The signal appearing at lead 55 is connected to the minimum threshold detector 20. To permit discharge of the capacitors, resistors 61 are paralleled with capacitors 59 and 60 to ground.

Referring now to FIG. 4, amplifier shaping network 19 includes a linear amplifier 62 connected to the ±12 volt potential supply with the input connected to the input signal at leads 53 and 54. Amplifier 62 has an output lead 63 to which a diminishing feedback network is connected. This latter network includes a first feedback path through a pair of resistors 64 and 65 to the input side of amplifier 62. The feedback is stepped, and for most accurate shaping, three paralleled diodes 66, 67 and 68 have their anodes connected in common to the feedback junction path between resistors 64 and 65.

In accordance with an optimum practice of the invention, the cathodes of diodes 66, 67 and 68 are connected to the positive side of the bias supply and are selectively and differently reversed biased through a voltage dividing network including paralleled branches, each including a pair of series connected resistors 69 connected between the positive supply and ground. The several resistors 69 are selected to establish selectively different voltages at the junctions 69a, 69b and 69c of the three branches. Diode 66 is reversed biased in the least degree from ±12 volts power as a result of the selected potential at junction 69a to which it is connected in series with a resistor 70. Similarly, diode 67 is back biased to a greater extent through a resistor 71 and connected to the junction 69b. The third voltage divider network junction 69c is connected to diode 68 through a resistor 72, and back biases it to a third, largest extent. By this means, feedback through resistor 65 will be decreased in steps in response to the output voltage signal, rising to first overcome the back bias of diode 66, which conducts. Sequentially at a higher output of amplifier 62, diode 67 conducts, and finally at a third higher output, diode 68 conducts. When the diodes conduct, current is shunted from the feedback path and the diminished feedback increases the amplifier output for a given amplitude input and thus shapes the signal with an accelerated increase in its amplitude as the decibel level that microphone 5 senses increases. The voltage dividers should be chosen to provide amplitude shaping such that pulser 21 drives the counter at the particular increased rate desired for the higher decibel noise levels.

Output from network 19 in FIG. 4 is, after attenuation in a variable resistor system 73, conducted by a lead 74 to pulser 21 in FIG. 5, while output lead 63, connecting to the output terminal of amplifier 62, provides a proportionate voltage signal input to the maximum threshold detector 27 which was described before. Thus, the output of the square law detector 18 of FIG. 3 is suitably shaped and then impressed upon the pulser 21 and the detector 27. The output of detector 18 is also applied to the minimum threshold detector 20 via the output lead 55.

Referring to the lower portion of FIG. 4, lead 55 conducts the signal from detector 18 to a NPN transistor 75 in minimum threshold detector 20. Transistor 75 is connected in a common emitter configuration with a collector resistor 76 connected to +12 volt power and, through an emitter resistor 77, to the −12 volt potential line. The signal turns the transistor 75 on and provides a noise level related signal input to a comparator 78.

To establish a fixed second input voltage for comparison to this signal input voltage, a NPN transistor 79 has its base connected to the junction of a voltage divider network which includes a variable resistor 80 connecting from the junction to ground and a resistor 81 connected to a +12 volt power. The collector and emitter of transistor 79 are floated between ±12 volt lines with biasing resistors 82 and 83 connected between their respective potentials and transistor terminals.

Variable resistor 80 in the voltage divider is adjusted to establish the desired threshold voltage appearing as another or second input to comparator 78. For example, the voltage threshold could be calibrated such that comparator 78 establishes an output when the noise level sensed by microphone 5 rises to 90 decibels. Comparator 78 is between +12 volt and −12 volt potentials. Additionally, a capacitor 84 across the input terminals of comparator 78 serves to eliminate switching voltage oscillations.

The output from comparator 78 controls a switching transistor 85 and is connected thereto through resistances 86 and 87 in a voltage divider network. The base of transistor 85, which is a NPN type, connects to the junction of the voltage divider. Transistor 85 is biased on by the output of comparator 78 until the cutoff signal from transistor 75 rises to the selected minimum threshold level. Transistor 85 conducts from a lead 88 that connects the collector of transistors 85 to gate 22 and to the positive supply through a pair of series connected bias supply resistors 89 (See FIG. 5). The conduction path is completed through the emitter and an emitter resistor 90 connected to the −12 volt potential. The emitter of transistor 86 is maintained at essentially zero or ground potential by connecting it to the cathode terminal of a diode 91 from ground.

The gate 22 is shown as a transistor 92 having its base connected to lead 88, its emitter grounded, and its collector connected to the output lead 93. The minimum threshold detector 20, and particularly transistor 85, selectively drains or by-passes input current from the gate transistor 92 until the threshold level is surpassed by the input signal to detector 20. As seen in FIG. 5, this serves to hold gate 22 off until the threshold level is exceeded and prevents the pulses from pulser 21 from passing to pulse divider 23 via the gate output lead 93. When the threshold level is reached, the gate 22 is opened and the pulser signals pass through gate transistor 92 to divider 23.

Pulser 21, as shown in FIG. 5, is a unijunction oscillator construction and has a unijunction transistor 94 which drives a NPN transistor 95 to establish an amplified pulse train. The emitter of unijunction transistor 94 is also connected to the base of transistor 95 by a capacitor 96. When transistor 94 conducts, the capacitor 96 back biases transistor 95 to cutoff. Thus, when transistor 94 is on, transistor 95 is off and when transistor 94 is off, transistor 95 is on.

Pulser 21 is a known voltage to pulse rate converter system having a voltage controlled current source shown as a transistor network 97. The transistor network 97 controls the charging of capacitor 98 connected across the emitter to base circuit of the unijunction transistor. The signal voltage at the base of the first transistor in network 97 determines the current and thus the rate at which capacitor 98 charges. This in turn determines the firing periods of transistor 94 and the frequency of oscillation.

The voltage at the base of the first transistor in network 97 varies in accordance with the amplitude of the input signal applied through lead 74 from the network 19 of FIG. 4. The voltage at the base is determined by applying the input across a PNP transistor 99 in a double transistor device which has its emitters connected to the −12 volt lead. The junction of the collector of transistor 99 and the resistors connecting to the positive lead is a voltage junction which applies a potential to the base of network 97. The voltage is the result of the drop across a resistor 100 and transistor 99 as in the conventional circuit of this type.

A variable resistor 101 provides a variable potential that is applied via resistor 102 to a summing junction consisting of the base of transistor 99, resistor 103, a diode 104 and the input resistor from lead 74. Variable resistor 101 sets the initial pulse rate. The input voltage at 74 is applied to the summing junction and a voltage proportional to the operating frequency is applied via diode 104 to the summing junction in order to stabilize the operating frequency in a known manner.

To stabilize the response of the pulser, feedback is provided which, for this system, results in about ½ percent linearity. For this purpose, a capacitor 105 in series with a resistor is connected in parallel with capacitor 98, with the junction connected to the base of transistor 99 through diode 104. Capacitor 105 will discharge when the frequency of pulsing increases too fast, thus providing a conducting path through diode 104 from the base of transistor 99. This lowers the potential at the collector of that transistor to thereby reduce the frequency of oscillation for the pulser. In this way, negative feedback is achieved to stabilize the operating frequency.

OVERALL OPERATION

Summarizing the operation of the sound level integrator, an operator will place the instrument in the desired location, at the beginning of a work day, for instance, turn the power on, and reset the counter and lamps if they are lit. Each instantaneous sound level is sensed by microphone 5, and in the manner described above, the networks in the instrument ultimately drive register 8 to establish a cumulative reading of the hazardous noise levels experienced in terms of the ratio of the permissible exposure to the actual noise experienced over time. If the noise experienced over the work day, such as 8 hours, does not exceed the permissible total exposure, this instrument gives no further reading, and the operator turns off the power, resets the counter and may then charge the battery for the next day's operation.

If, however, the permissible limit is exceeded at any time of the day, register 8 is driven to 100 percent maximum, and cumulative exposure indicator 9 lights to signal this occurrence. Corrective action as to the noise levels may then be undertaken. The instrument is reset as above, and the indicator is reset as well.

In some instances, the maximum instantaneous sound level may be exceeded, in which case indicator 7 will light and at the same time register 8 is soon driven to 100 percent, again lighting indicator 9. As in the above examples, corrective action may then be undertaken, and the instrument reset.

During operation, the battery is continuously monitored by the battery test circuit, and if it has insufficient power left, light 14 will be energized to indicate this status.

Thus, the invention provides means for automatically indicating cumulative exposure to hazardous noise levels, and gives readings in accordance with the permissible exposure to the actual noise experienced. This is combined with indication means which signal when the maximum noise hazards have been experienced.

Various modes of carrying out the invention are contemplated as being within the scope of the following claims particularly pointing out and distinctly claiming the subject matter which is regarded as the invention.

We claim:

1. A sound level instrument for indicating exposure to sound, comprising;
    a transducer which establishes an electrical signal in accordance with sensed sound;
    amplitude shaping means coupled to said transducer with said electrical signal constituting an input signal for establishing an amplitude shaped output which is weighted in response to amplitude of said electrical signal and is increased in amplitude in response to higher amplitude input signals;
    integrator means connected to said shaping means for establishing a cumulative count with time proportional to the amplitude of said shaped output;
    whereby said cumulative count is varied in accordance with the sensed sound,
    and means for establishing a signal representative of said cumulative count.

2. The sound level instrument of claim 1 and including a minimum threshold detector operatively connecting the shaping means and integrator means and having networks which start and stop said cumulative count in response to a predetermined minimum sound level.

3. The sound level instrument of claim 1 wherein said signal establishing means includes a digital readout apparatus driven by said integrator means and continuously indicating said cumulated count.

4. The sound level instrument of claim 1 and including an alarm indicator means for providing a signal when said sensed sound reaches a predetermined maximum loudness level.

5. The sound level instrument of claim 1 and including frequency shaping means connected to said transducer and to said amplitude shaping means and establishing a frequency shaped input signal to said amplitude shaping means for weighting said frequency shaped output in accordance with a predetermined scale.

6. The sound level instrument of claim 1 wherein said amplitude shaping means comprising an amplifier and a diminishing feed back network across said amplifier.

7. The sound level instrument of claim 1 wherein said integrator means comprises:

a pulser which pulses at a rate proportional to the voltage of said amplitude shaped output, said rate being variable over a predetermined high range;

a pulse divider connected to receive said pulses;

a counter driven by said pulse divider and having means for providing a counter signal when said maximum value is reached;

an indicator; and a flip flop control by said counter signal and providing a conducting path to energize said indicator when said counter signal is provided.

8. The sound level instrument of claim 7 and including a cumulative digital register driven by said counter and indicating the per cent of a predetermined maximum cumulative exposure over time experienced by said transducer.

9. A sound hazard integrator for establishing an indication of the noise hazard for varied sensed sound waves, the integrator comprising, in combination:

a microphone;

an amplitude shaping network connected to said microphone;

a pulser connected to said amplitude shaping network, said pulser having a voltage controlled pulse rate which in cooperation with said amplitude shaping network establishes a pulse rate output proportional to the sound level received by said microphone whereby said pulse rate output is varied in accordance with the sensed sound; and means for cumulating said pulse output and operative to establish a signal representative of said pulse output cumulation.

10. The integrator of claim 9, and including a frequency shaping network connected to said microphone for shaping a signal applied to said amplitude shaping network, said frequency shaping network being a cascaded R-C system which discriminates against lower audible frequency waves in accordance with an A Scale weighted curve.

11. The sound level instrument of claim 1 wherein said means for establishing a signal includes an indicator for establishing a signal in response to said cumulative count.

12. The sound level instrument of claim 1 wherein said means for establishing a signal includes a digital readout apparatus for continuously indicating said cumulated count.

13. Sound level instrument of claim 1 wherein said signal establishing means includes an indicator for establishing a signal, and a flip flop controlled in accordance with said cumulative count and operative to provide a conducting path to energize said indicator when a preselected cumulative count is reached.

14. A sound hazard integrator for establishing an indication of the noise hazard for varied sensed sound waves, the integrator comprising in combination;

a microphone;

an amplitude shaping network connected to said microphone and comprising an amplifier and feed back network which weights an output signal in accordance with a predetermined accelerated increase in amplitude for higher sound levels;

a pulser connected to said amplitude shaping network, said pulser being a voltage controlled voltage to frequency converter which generates pulses at a rate proportional to the amplitude of the input signal from said amplitude shaping network and which in cooperation with said amplitude shaping network establishes a pulse output in accordance with a function of the total time at a specific decibel level divided by a predetermined total time permissible at said specific level; and a counter for cumulating said pulse output.

15. The integrator of claim 14 and including an indicator driven by said counter.

* * * * *